United States Patent Office 3,502,651
Patented Mar. 24, 1970

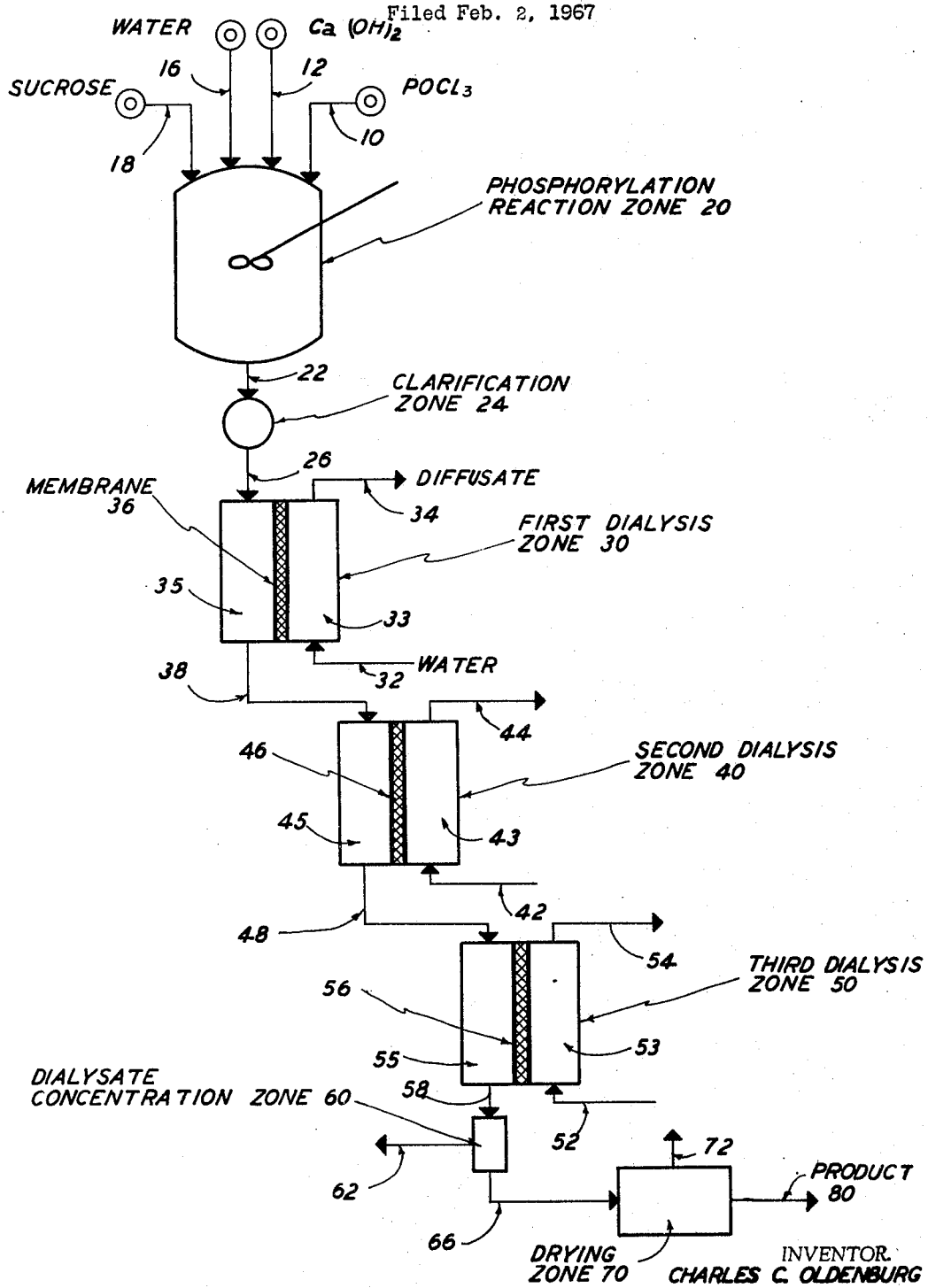

3,502,651
DIALYSIS OF SUGAR PHOSPHORYLATION REACTION SOLUTIONS
Charles C. Oldenburg, Mill Valley, Calif., assignor, by mesne assignments, to The Colonial Sugar Refining Company Limited, Sydney, New South Wales, Australia, a corporation of Australia
Filed Feb. 2, 1967, Ser. No. 613,639
Int. Cl. C13d *3/16;* C07c *47/18;* C01f *11/00*
U.S. Cl. 260—234    15 Claims

ABSTRACT OF THE DISCLOSURE

A process for selectively separating calcium chloride from a liquor containing a calcium sugar phosphate, inorganic calcium phosphate, and calcium chloride by (1) maintaining the liquor in mass transfer relationship through a suitable dialysis membrane, such as parchment, with a second liquor, such as water, which is relatively dilute with respect to calcium chloride under conditions including a temperature below 30° C. such that calcium chloride is selectively diffused through the membrane into the second liquor and (2) recovering phosphate containing liquor substantially depleted in calcium chloride.

---

Calcium sucrose phosphate and complex mixtures thereof with inorganic calcium phosphate have been found to be useful in the prevention of dental caries, as plant and animal nutrients, and coatings for breakfast cereals, and are believed to have wide application in a variety of fields. It is known from German Patent 247,809 that calcium sucrose phosphate can be produced by the phosphorylation of sucrose in the presence of lime. That patent sets forth the known method of separating the resulting calcium chloride from the calcium sucrose phosphate containing reaction product, namely, via ethanol precipitation and a series of washes. Complex mixtures of calcium sucrose phosphate and inorganic calcium phosphates are disclosed in copending application Ser. No. 414,074, granted as U.S. Patent No. 3,375,168 on Mar. 26, 1968, together with several novel methods of making the complex. The method of separating the calcium chloride which, if allowed to remain in the final product causes the same to deliquesce and become liquid upon exposure to atmospheric moisture, disclosed in copending application, Ser. No. 414,074, is essentially the same as disclosed in the German patent. While separation of calcium chloride by employing a process whereby ethanol is used to precipitate the complex mixture of calcium sucrose phosphate and inorganic calcium phosphate and to leach calcium chloride from the complex works quite satisfactorily, it is unfortunately inefficient and economically impracticable on a commercial scale. It is therefore the principal object of the present invention to overcome and eliminate the deficiencies inherent in the known methods for the separation of calcium chloride from mixtures thereof with calcium sucrose phosphate and inorganic calcium phosphate.

Another object of the present invention is to provide an economically attractive process for recovering a calcium sucrose phosphate containing product essentially free of hygroscopic substances such as calcium chloride.

Another object of the present invention is to separate calcium chloride from the product of reaction of the phosphorylation of a sugar in the presence of calcium oxy-compounds such as lime.

Another object of the present invention is to provide a process for the separation of calcium chloride from a solution thereof containing essentially calcium sucrose phosphate and inorganic calcium phosphate in a selective manner such that the relative amount of phosphate removed from the product is minimized.

Other objects and advantages will become apparent to those skilled in the art from the following description and disclosure.

These and other objects are generally accomplished in accordance with the method of the present invention by maintaining a dialysate liquor containing essentially a calcium sugar phosphate (for example, calcium sucrose phosphate), inorganic calcium phosphate and calcium chloride in mass transfer relationship through a suitable dialysis membrane with a suitable liquor such as water, having a lower concentration of calcium chloride than the dialysate liquor whereby the dialysate liquor is depleted with respect to calcium chloride at a rate which is relatively large with respect to the rate of depletion of the dialysate liquor in regard to the phosphates constituents thereof. The phrase "containing essentially" is employed herein to define liquor constituents which are necessarily present but does not exclude the presence of other constituents in the liquor, e.g., unreacted sugar which may be present in substantial percentages.

Based on theoretical considerations, one skilled in the art might have predicted that the relative dialysis rates of calcium sucrose phosphate (the molecular weight of calcium sucrose phosphate being 460 and of the sucrose phosphate portion being 420) and calcium chloride (the molecular weight of calcium chloride being 111 and the atomic weight of the chloride ion being 35.5) would be of the order of magnitude of about 1 to 4 considering the calcium sucrose phosphate and the calcium chloride and of the order of magnitude of about 1 to 12 considering the sucrose phosphate and chloride ions, and the relative dialysis rates of inorganic calcium phosphate to calcium chloride would be about the same order of magnitude and of the phosphate ion to the chloride ion would be about 1 to 3. Based on these and other considerations, there is clearly no prior suggestion that calcium chloride can be satisfactorily and selectively separated from a solution containing both calcium sucrose phosphate and inorganic calcium phosphate such as is contained in a sucrose phosphorylation reaction liquor. Very surprisingly, however, it has now been discovered that calcium chloride can be separated on a highly selective basis from a mixture thereof containing calcium sucrose phosphate and inorganic calcium phosphate. Quite unexpectedly, it has been found that calcium chloride can be dialyzed through a suitable membrane at a rate as high as about 30–50 times graeter than the rate of dialysis of calcium sucrose phosphate, and even more surprisingly that in such a mixture the inorganic calcium phosphate does not appear to dialyze in any substantial amount.

In general, any suitable permeable membrane can be employed in the practice of the present invention. Representative membranes which have been found suitable include cellophane, parchment, and polymeric films such as are described in U.S. Patent No. 3,069,340. Two important criteria in the selection of suitable membranes include, (1) a high ratio of dialysis coefficients for the dialysis of calcium chloride as compared with both calcium sucrose phosphate and inorganic calcium phosphate in order to minimize product loss and (2) a high dialysis coefficient for calcium chloride, itself, in order to permit the use of a minimum amount of membrane area. The term "dialysis coefficient" which is designated by the symbol ($U_0$) is employed in this specification is intended to mean the rate of a specified compound, e.g., calcium chloride, transferred through a membrane expressed in pounds per hour divided by the area of the membrane expressed in square feet and also divided by the log mean concentration difference between the dialysate liquor cell and the water cell in grams of compound per milliliter of solution. Highly satisfactory results have been obtained employing both cellophane and parchment membranes which are known to have relatively small pore diameters, e.g. 30–40 A., whereas membranes of certain polymeric film, such as are described in U.S. Patent No. 3,069,340 and having pore diameters between 60–100 A., exhibit lower ratios of the dialysis coefficients between calcium chloride and calcium sucrose phosphate. While membranes having relatively larger pore sizes exhibit higher over-all dialysis coefficients, their selectivity of the passage of calcium chloride appears to be poorer, and since the most important factor from an economic point of view is selectivity in the rate of calcium chloride dialysis as compared with both the dialysis of calcium sucrose phosphate and the dialysis of inorganic calcium phosphate, membranes exhibiting greater selectivity are preferred.

The process of dialysis of mixtures containing calcium sucrose phosphate, inorganic calcium phosphate and calcium chloride, is preferably carried out at a temperature around room temperature or lower in order to effect preferential or selective separation of calcium chloride therefrom. Temperatures below about 30° C. are preferred and temperatures between about 15° C. and about 25° C. comprise a most preferred temperature range. It has been found that generally the dialysis coefficients increase with increasing temperature, however, it has likewise been found that the rate of dialysis of calcium sucrose phosphate shows a suprisingly more rapid rate of increase than that of calcium chloride at higher temperatures. Therefore, since the selectivity is most important from an economical point of view, lower temperatures are preferred. For example, at room temperature, e.g., 15–20° C., the relative rate of dialysis of calcium chloride to calcium sucrose phosphate was observed to be about 43, whereas at about 30° C. under the same conditions, relative rates were observed to be about 27.

In the practice of the present invention, it has been found by experimentation with cells of varying design that dialysis cells which cause an increase in velocity of the dialysate liquor past the membrane show an improvement in the dialysis coefficients for calcium chloride. Therefore, a cell design offering relatively high velocity of the dialysate liquor past the membrane is preferred.

Having thus described the invention in general terms, reference is now made to the figure of the drawing which illustrates diagrammatically a preferred process for the production of a refined calcium sucrose phosphate containing product in accordance with the process of the present invention.

Referring to the drawing, a calcium sucrose phosphate containing material is prepared in phosphorylation reaction zone 20 by the introduction of suitable quantities of sucrose via line 18, water via line 16, and a calcium oxy-compound selected from the group consisting of calcium hydroxide, calcium oxide and calcium carbonate in line 12, and thereafter slowly introducing phosphorous oxychloride ($POCl_3$) via line 10 while agitating the reaction mixture in zone 20. The phosphorylation reaction zone is preferably maintained at a temperature between about 0° and about 20° C. by the application of suitable cooling means. The reaction can be carried out in a batch or continuous manner and the phosphorus oxychloride can be introduced either by itself, as set forth in the copending U.S. application Ser. No. 613,619 of Campbell, Oldenburg and Simone filed herewith, now U.S. Patent No. 3,437,652 granted on Apr. 8, 1969, or in solution of a chlorinated hydrocarbon solvent such as trichloroethylene or chloroform. As disclosed in copending U.S. application Ser. No. 262,230, now abandoned, the ratio of sugar to calcium oxy-compound to phosphorus oxychloride is preferably stoichiometric. When the reaction in zone 20 has been carried out to the desired degree, a turbid reaction solution is obtained containing calcium sucrose phosphate, inorganic calcium phosphate and unreacted sucrose in water.

The reaction liquor is passed in line 22 to a suitable clarification zone 24. Satisfactory clarification has been obtained using a centrifugal clarifier operated at 24,000 r.p.m. as set forth in the above-identified application Ser. No. 613,619 filed herewith. Clarified reaction liquor is passed via line 26 to the first dialysis zone 30 for separation of calcium chloride in accordance with the present invention.

In the figure of the drawing the reaction liquor is shown being flowed serially through three stages of dialysis in which calcium chloride is separated on a highly selective basis from phosphates containing material including calcium sucrose phosphate and inorganic calcium phosphate by transfer thereof from the dialysate liquor into diffusate liquor maintained relatively low in calcium chloride concentration. For commercial operation, staged dialysis treatments of the reaction liquor is preferred; and for the production of an essentially calcium chloride free calcium sucrose phosphate containing product a three stage dialysis process is most preferred. In a three stage dialysis process calcium sucrose phosphate product containing less than about 0.5% calcium chloride can be produced. Reference to a product "essentially free of calcium chloride" is intended to mean a product from which sufficient calcium chloride has been removed to make it non-deliquescent.

Referring again to first stage dialysis zone 30, clarified reaction liquor is introduced to the liquor cell 35 of dialysis zone 30 via line 26, wherein it is maintained in mass transfer relationship via membrane 36 with water cell 33. Water introduced via line 32 to water cell 33 passes in countercurrent flow through the dialysis zone accepting calcium chloride which diffuses through the membrane. The aqueous stream enriched in calcium chloride, withdrawn in line 34, is called the diffusate. The first stage dialysate liquor is withdrawn via line 38, substantially reduced in calcium chloride concentration but not substantially altered with regard to the concentration of phosphates material.

Dialysate liquor in line 38 is employed as the feed to the second stage dialysis zone 40 and is introduced to liquor cell 45 thereof. Fresh water is introduced via line 42 to water cell 43 of zone 40. Line 44 represents the diffusate draw-off from zone 40. Numeral 46 represents the membrane of dialysis zone 40 which is preferably the same, although it may be different from membrane 36. The second stage dialysate liquor further reduced in calcium chloride concentration, is withdrawn from liquor cell 45 via line 48. It is passed to third stage dialysis zone 50 where it is maintained in mass transfer relationship through membrane 56 which separates liquor cell 55 from water cell 53 with water introduced in line 52. Third stage diffusate is withdrawn in line 54. The third stage of dialysis preferably reduces the calcium chloride concentration of the phosphate containing product to about 0.5% or less. The final dialysate is withdrawn in line 58 and is preferably passed to a suitable dialysate concentration zone 60. Since counter-diffusion of water into the dialysate solution occurs, it is preferable to remove water prior to passage of the dialysate to drying zone 70. If desired the clarified reaction liquor or any prior dialysate liquor can also be concentrated. Line 62 represents the removal of water, e.g., by evaporation from the final dialysate. Concentrated dialysate is passed via line 66 to a suitable drying zone 70 which is preferably a spray dryer, wherein water is removed via line 72 and a free flowing product is withdrawn in line 80.

PREPARATION OF PHOSPHORYLATION
REACTION LIQUOR

Liquors containing essentially calcium sucrose phosphate, inorganic calcium phosphate and calcium chloride employed in the following examples were prepared in the following manner. A 30 gallon stainless steel baffled reactor equipped with a suitable stirrer and immersed in a drum of isopropanol-Dry Ice was employed as the reaction zone. Refined sucrose in the amount of 42.29 lbs. was dissolved in 21.31 lbs. water. Next, 104.02 lbs. tap water and 22.42 lbs. calcium hydroxide were charged to the reactor and the slurry agitated at room temperature. After about 15 minutes the sucrose solution was charged into the reactor with a temperature rise to 8° C. The mixture was cooled to 5° C. with an external isopropanol-Dry Ice bath. Phosphorus oxychloride in the amount of 19.41 lbs. was charged slowly to the reactor at a temperature of 3–5° C. The $POCl_3$ addition was stopped when the pH of the mixture reached 9.0. When the $POCl_3$ addition was complete agitation was continued for about one half hour at a temperature of 3–5° C. At the end of this time the pH had fallen to 7.5. Next agitation was stopped and the reactor contents warmed to room temperature overnight. The crude reaction mass was clarified by passing it through a laboratory Sharples super centrifugal clarifier. About 3.04 lbs. of slime was removed. The composition of typical clarified reaction mass is set forth below in Table 1.

Table 1.—Typical composition of clarified reaction solution

| | |
|---|---|
| Ca, percent | 5.69 |
| Cl, percent | 6.16 |
| P total, percent | 1.830 |
| P inorganic, percent | 0.393 |
| P organic, percent | 1.437 |
| Sucrose, percent | 7.0 |
| Total solids, percent | 37 |
| Density, g./ml. | 1.25 |
| Viscosity at 20° C., cp. | 14 |

EXAMPLES 1–12

A series of experiments were carried out employing dialysis equipment which is schematically represented by reference to first dialysis zone 30. The two types of cells differing in physical design only, namely the Brosites and Graver Laboratory dialysis units were employed. Clarified reaction solution, described in Table 1 above, was continuously pumped for flow through 35 while water was pumped for flow through 33. The two feeds flowed countercurrently past the membrane 36 causing calcium chloride to diffuse through the membrane from the liquor to the water. The results of twelve runs, Examples 1 through 12, are presented in Table 2 below.

TABLE 3

| Membrane | | $CaCl_2$ dialysis coefficient, $U_0$ | Ratio $CaCl_2/CSP$ dialysis coefficients, $U_0/U_0'$ |
|---|---|---|---|
| Run: | | | |
| G | 300 gauge cellophane | 0.57 | 34 |
| B-1 | 450 gauge cellophane | 0.41 | 34 |
| C | 600 gauge cellophane | 0.39 | 41 |
| D | 27 lbs./ream parchment | 0.30 | 46 |
| U | 35 lbs./ream parchment | 0.26 | 42 |
| E | Polymeric film[1] | 0.61 | 17 |

[1] Vinyl chloride, acrylonitrile copolymer based film as described in U.S. Patent 3,069,340.

It is noted from Table 3 above that the most satisfactory results were obtained with 27 lb./ream parchment.

Correlation of the amount of calcium sucrose phosphate which is lost vs. the chloride removal indicates generally that the higher the amount of chloride removed the higher the amount of total phosphorus lost. Such a correlation shows that 80% by weight chloride removal corresponds to about 3.6% total phosphorus loss. Below about 80% the total phosorus loss decreases slowly, but above 80% the total phosporus loss increases rapidly. Therefore, 80% by weight chloride removal in the first stage of dialysis appears to be about the optimum.

The data of Table 2 illustrate the surprising results that the total phosphorus dialysis increases more with temperature than the calcium chloride dialysis. At room temperature, 15 to 20° C., the relative dialysis coefficients of calcium chloride to calcium sucrose phosphate is about 43 (Example 10), while at 30° C., about 27 (Example 9).

The data of Table 2 show that at any pressure differential in the range of 0 to 15 inches of water across the membrane, counter-diffusion of water runs from between about 1.7 to 1.8 gram dialysate per gram of liquor.

The data likewise indicate that the Graver dialyzer which has cells ¼″ thick as opposed to the Brosite cells which are ½″ thick, result in higher average dialysis coefficients. The explanation offered is that higher velocities in the Graver unit decrease the resistance to film transfer caused by relatively stagnant liquid films that always exist at the solid-liquid interface (such as are found on each side of the membrane).

EXAMPLE 13

This example which is presented in tabular form via

TABLE 2.—CONTINUOUS DIALYSIS OF CRUDE PHOSPHORYLATION PRODUCT
[Feed: Clarified reaction mix from 30 gallon reactor]

| | Example Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Equipment: | | | | | | | | | | | | |
| Unit | B | B | B | B | B | B | B | B | G | G | G | B |
| Membrane description | (450) C | (600) C | (27) P | N | (300) C | (27) P | (27) P | (27) P | (27) P | (27) P | (27) P | (35) P |
| Membrane area, ft.² | 3.2 | 3.2 | 3.2 | 3.2 | 3.2 | 3.2 | 3.2 | 3.2 | 1.8 | 1.8 | 3.6 | 3.2 |
| Operating conditions: | | | | | | | | | | | | |
| Temperature, ° C | r.t. | r.t. | r.t. | r.t. | r.t. | r.t. | 30 | 30 | 30 | 19 | r.t. | r.t. |
| Level difference, dialysate-diffusate, inches | −2 | −1 | −0.2 | −0.2 | −0.2 | −0.4 | +7.5 | +14 | +11 | +11 | −2 | +8.5 |
| Liquor feed rate, g./min | 4.17 | 4.60 | 3.90 | 4.48 | 24.5 | 18.9 | 7.01 | 7.25 | 2.10 | 2.64 | 4.35 | 3.17 |
| Water feed rate, g./min | 81.2 | 82.9 | 84.0 | 82.4 | 79.0 | 77.0 | 80.6 | 85.5 | 62.8 | 59.5 | 93.2 | 63.3 |
| Performance: | | | | | | | | | | | | |
| Weight ratio dialysate to liquor | 1.7 | 1.7 | 1.8 | 1.5 | 1.2 | 1.3 | 1.7 | 1.7 | 1.7 | 1.7 | 1.8 | 1.8 |
| Chlorinde in liquor dialyzed to diffusate, percent | 91 | 84 | 82 | 97 | 44 | 30 | 64 | 61 | 92 | 79 | 87 | 84 |
| Total phosphorus in liquor dialyzed to diffusate, percent | 6.8 | 4.6 | 3.9 | 19.8 | 1.5 | 0.97 | 3.9 | 4.1 | 11.1 | 5.6 | 5.1 | 4.6 |
| Dialysis coefficients, lbs./hr. ft.² (g./ml.): | | | | | | | | | | | | |
| $CaCl_2$ | 0.41 | 0.39 | 0.30 | 0.61 | 0.57 | 0.30 | 0.34 | 0.31 | 0.43 | 0.35 | 0.43 | 0.26 |
| CSP [a] (assuming 460 g./31 g. total phosphorus) | 0.012 | 0.0097 | 0.0066 | 0.036 | 0.017 | 0.0092 | 0.012 | 0.012 | 0.016 | 0.0082 | 0.0087 | 0.0060 |
| Ratio $CaCl_2/CSP$ dialysis coefficients | 34 | 41 | 46 | 17 | 34 | 33 | 29 | 26 | 27 | 43 | 49 | 42 |

[a] = Calcium sucrose phosphate.
B = Biosites.
C = Cellophane (gauge).
G = Graver.
P = Parchment (lbs./ream).
N = Vinyl chloride, acrylonitrile copolymer based film, as described in U.S. Patent 3,069,340.

Six different membranes were tested in experiments 1 through 2 and some of the results abstracted from Table 2, above, are presented in Table 3 below.

Tables 4 and 5, below, presents the results of a six day continuous dialysis run employing as feed clarified reaction solution described in Example 1.

3,502,651

TABLE 4.—RESULTS OF CONTINUOUS DIALYSIS RUN V

Equipment: Graver dialyzer with 3.6 sq. ft. of 27 lbs. per ream parchment membranes.
Feed: Clarified reaction mix from 30 gallon reactor

| Time | Flow Rates, g./min. | | | | Temp., °C. | Height diff. dialysate-diffusate, inches | Matl. balance run | Remarks |
|---|---|---|---|---|---|---|---|---|
| | Liquor | Water | Dialysate | Diffusate | | | | |
| 0 | 4.7 | 94 | | | | 2 | | Start-up. |
| 0 to 17′20″ | 4.7 | 94 | | | 14 | 2 | | Membranes bulging into water cells decreasing effective area. |
| 17′20″ to 18′50″ | 4.7 | 94 | 7.5 | 91 | 14–18 | 2 | V-1 | 65% Cl dialysis; raised and lowered diffusate to correct membrane bulge. |
| 18′50″ to 41′30″ | 4.5 | 94 | | | 18–22 | 2 | | Membrane bulging still not completely eliminated but somewhat improved. |
| 41′30″ to 43′ | 4.6 | 94 | 7.0 | 91 | 20 | 2 | V-2 | 79% Cl dialysis; increased diffusate height ½″. |
| 43′ to 47′20″ | | | | | 22 | 2.5 | | Membrane bulging almost eliminated. |
| 47′20″ to 47′50″ | 4.7 | 92 | 8.9 | 88 | 22 | 2.5 | V-3 | 80% Cl dialysis; raised and lowered diffusate to correct membrane bulge completely. |
| 47′50″ to 68′15″ | | | | | 18–22 | 2.5 | | Excellent conditions. |
| 68′15″ to 68′30″ | 4.7 | 93 | 8.3 | 90 | 22 | 2.5 | V-4 | 82% Cl dialysis; raised diffusate height ½″. |
| 68′30″ to 95′30″ | | | | | 18–22 | 3 | | Excellent conditions. |
| 95′30″ to 97′ | 4.8 | 91 | 7.6 | 89 | 22 | 3 | V-5 | 89% Cl dialysis; excellent conditions. |
| 97′ to 143′15″ | | | | | 22 | 3 | | Excellent operating conditions. |
| 143′15″ | 4.8 | 91 | 7.6 | 89 | 22 | 3 | | Shutdown. |

Table 5.—Overall results of Run V (Table 4)

Test period: 143′15″.
Equipment: Graver dialyzer; 3.6 sq. ft. of 27 lbs. per ream parchment membranes.

Operating conditions:
Liquor feed rate, g./min. _____ 4.72
Water feed rate, g./min. _____ 93.2
Dialysate rate, g./min. _____ 7.77
Diffusate rate, g./min. _____ 90.1
Temperature, °C. _____ 18±5
Dialysate-diffusate height, inches _____ 2½±½

MATERIAL BALANCE

| | In | | Out | |
|---|---|---|---|---|
| Liquor | 78.56 lbs. | Dialysate | 129.38 lbs. | |
| Water | 1,552.75 lbs. | Diffusate | 1,500.30 lbs. | |
| Total | 1,631.31 lbs. | Total | 1,629.68 lbs. | |

Loss—0.1%.

Performance:
Weight ratio dialysate to diffusate _____ 1.65
Calcium chloride removal, percent _____ 83.8
Total phosphorus removal, percent _____ 4.0
Sucrose removal, percent _____ 26.4
$U_0$, lbs. $CaCl_2$/hr.-ft.$^2$ (g./ml.) _____ 0.316
$U_0'$, lbs. CSP/hr.-ft.$^2$ (g./ml.) _____ 0.0064
$U_0/U_0'$ _____ 49

EXAMPLE 14

This example, presented in Table 6, illustrates second stage dialysis, e.g. in zone 40.

TABLE 6.—SECOND STAGE DIALYSIS

Feed: Dialysate from Run V concentrated to a total phosphorus content of 2%.
Equipment: Graver Laboratory dialyzer with 27 lbs. per ream parchment membranes.
Conditions: Room temperature, dialysate-diffusate level difference=3 inches.

| | Experiment No. | | | | | |
|---|---|---|---|---|---|---|
| | W-1 | W-2 | X | Y-1 | Y-2 | Y overall |
| Membrane area, ft.$^2$ | 1.8 | 1.8 | 1.8 | 3.6 | 3.6 | 3.6 |
| Total phosphorus in feed, percent | 2.00 | 2.00 | 1.57 | 1.94 | 1.94 | 1.94 |
| $CaCl_2$ in feed, percent | 1.45 | 1.45 | 2.46 | 2.02 | 2.02 | 2.02 |
| Liquor feed rate, g./min. | 1.2? | 1.2? | 3.01 | 4.72 | 6.08 | 5.41 |
| Water feed rate, g./min. | 24.3 | 24.7 | 59.4 | 47.9 | 99.6 | 73.8 |
| Wt. ratio dialysate to liquor | 2.0? | 2.0? | 1.44 | 1.56 | 1.40 | 1.48 |
| Calcium chloride in liquor dialyzed to diffusate, percent | 98.4 | 99.0 | 79.7 | 87.7 | 77.1 | 83.8 |
| Total phosphorus in liquor dialyzed to diffusate, percent | 13.6 | 10.6 | 5.0 | 5.1 | 3.9 | 5.2 |
| Sucrose in liquor dialyzed to diffusate, percent | | | | 35.4 | 21.5 | 45.3 |
| Dialysis coefficient, lbs. $CaCl_2$/hr.-ft.$^2$-(g./ml.) | 0.38? | 0.45? | 0.36 | 0.40 | 0.34 | 0.39 |

EXAMPLE 15

This example illustrates a third-stage dialysis, e.g., in zone 50.

TABLE 7.—THIRD STAGE DIALYSIS

Feed: Dialysate from Run Y concentrated to a total phosphorus content of about 2%.
Equipment: Graver Laboratory Dialyzer with 1.8 sq. ft. of 27 lbs. per ream parchment membranes.
Conditions: Room temperature, dialysate-diffusate level difference=3 inches.

| | Experiment No. | | |
|---|---|---|---|
| | Z-1 | Z-2 | Z-overall |
| Liquor feed rate, g./min. | 3.74 | 3.77 | 3.76 |
| Water feed rate, g./min. | 53.8 | 53.8 | 53.8 |
| Wt. ratio dialysate to liquor | 1.45 | 1.40 | 1.43 |
| $CaCl_2$ in liquor dialyzed to diffusate, percent | 95.3 | 90.2 | 95.4 |
| Total phosphorus in liquor dialyzed to diffusate, percent | 4.6 | 4.2 | 4.4 |
| Sucrose in liquor dialyzed to diffusate, percent | 25 | 25 | 30 |
| Dialysis coefficient, lbs. $CaCl_2$/hr. ft.$^2$-(g./ml.) | 0.84 | 0.71 | 0.81 |

It is noted in the third stage of dialysis that the dialysis coefficients are surprisingly twice as high as observed during the first two stages of dialysis. A summary of the results of the three stages of dialysis is presented below in Table 8.

TABLE 8.—OVERALL RESULTS OF THREE STAGES OF DIALYSIS

Run Z is the final run in the process demonstration series. Overall results are as follows:

| | Stage | | | |
|---|---|---|---|---|
| | 1 | 2 | 3 | Total |
| Calcium chloride removed, percent | 84 | 84 | 95 | 99.9 |
| Loss of total phosphorus, percent | 4.0 | 5.2 | 4.4 | 13.0 |
| Sucrose removed, percent | 26 | 28 | 30 | 62.7 |
| Dialysis coefficient, lbs. $CaCl_2$/hr.-ft.$_2$-(g./ml.) | 0.32 | 0.39 | 0.81 | |

The analysis of the product of the third stage of dialysis is set forth in Table 9. It is printed out that product specifications usually call for 0.5% or less of calcium chloride.

TABLE 9

| | FOUND | |
|---|---|---|
| | As Is | Sugar-Free |
| Weight percent (Dry basis): | | |
| Calcium | 9.06 | 10.5 |
| Phosphorus (total) | 7.90 | 9.12 |
| Phosphorus (inorg.) | 1.82 | 2.10 |
| Chloride | 0.079 | 0.091 |
| Sugar | 13.4 | |

Having thus described the invention with reference to specific examples of operation thereof, many modifications and alterations will become apparent to those skilled in the art without departing from the spirit and scope thereof. For example it is readily apparent that while the present invention and method thereof have been described with reference to the separation of calcium chloride from a liquor comprising inorganic calcium phosphate, and a particular calcium sugar phosphate derived from sucrose, it is apparent that such method applies as well to cases where the calcium sugar phosphate is derived from other sugars such as galactose, arabinose, ribose, xylose, maltose, lactose, raffinose and glucose.

What is claimed is:

1. A method of selectively separating calcium chloride from a liquor containing essentially a calcium sugar phosphate, inorganic calcium phosphate, and calcium chloride which comprises maintaining said phosphates containing liquor in mass transfer relationship through a suitable dialysis membrane with a second liquor which is relatively dilute with respect to calcium chloride under conditions such that calcium chloride is selectively diffused through such membrane into said relatively dilute liquor and recovering phosphates containing liquor substantially depleted in calcium chloride.

2. The method of claim 1 in which said phosphates containing liquor and said relatively dilute liquor are flowed in counter-current relationship on opposite sides of said membrane through a suitable dialysis zone.

3. The method of claim 1 in which said operating conditions include a temperature below about 30° C.

4. The method of claim 1 in which said operating conditions include a temperature between about 15° C. and about 25° C.

5. The method of claim 1 in which said membrane comprises parchment.

6. The method of claim 1 in which said membrane comprises cellophane.

7. The method of claim 1 in which said phosphates containing liquor is produced by the phosphorylation of a suitable sugar in the presence of lime.

8. The method of claim 7 in which said sugar comprises sucrose.

9. The method of claim 7 in which said sugar is selected from the group consisting of galactose, arabinose, ribose, xylose, maltose, lactose, raffinose, and glucose.

10. The method of claim 1 in which said relatively dilute liquor comprises water.

11. A process which comprises phosphorylating sucrose with phosphorus oxychloride in the presence of a suitable calcium oxycompound selected from the group consisting of calcium carbonate, calcium hydroxide and calcium oxide at a temperature of between about 0 and about 20° C. to produce a reaction liquor containing calcium sucrose phosphate, inorganic calcium phosphate, unreacted sucrose and calcium chloride, passing said reaction liquor serially through a plurality of dialysis zones in which said liquor is maintained in mass transfer relationship through suitable dialysis membranes with liquid comprising water to selectively separate calcium chloride from said phosphates of said reaction liquor, and recovering a product liquor containing said phosphates and substantially depleted in calcium chloride.

12. The process of claim 11 in which said plurality consists of three dialysis zones arranged for serial flow of said reaction liquor which is successively depleted in calcium chloride by flow therethrough.

13. The process of claim 12 in which fresh water is separately introduced to each of said three dialysis zones and maintained in mass transfer relationship with the reaction solutions successively depleted in calcium chloride in each zone.

14. The process of claim 11 in which conditions in the first of said plurality of dialysis zones are maintained such that calcium chloride removal does not exceed about 80% by weight of the calcium chloride originally present in said liquor thereby minimizing loss of said phosphates.

15. The process of claim 11 in which said product liquor contains 0.5% by weight or less of calcium chloride when analyzed on a dry basis.

References Cited

UNITED STATES PATENTS

| | | | |
|---|---|---|---|
| 1,573,703 | 2/1926 | Griffin | 210—321 X |
| 1,714,039 | 5/1929 | Muto et al. | 210—22 X |
| 1,719,754 | 7/1929 | Cerini | 210—22 |
| 2,040,805 | 5/1936 | Casey | 127—54 X |
| 2,571,210 | 10/1951 | Craver | 210—22 X |
| 3,228,877 | 1/1966 | Mahon | 210—22 |
| 3,375,168 | 3/1968 | Curtin et al. | 260—234 X |

FOREIGN PATENTS

| | | |
|---|---|---|
| 179,919 | 7/1923 | Great Britain. |
| 709,179 | 5/1954 | Great Britain. |

OTHER REFERENCES

Lane et al.: "Dialysis," from Adsorption, Dialysis, and Ion Exchange, Chemical Engineering Progress Symposium Series, No. 24, vol. 55, 1959, received in Patent Office Sept. 21, 1959, published by American Institute of Chemical Engineers, New York, N.Y., 219 pps., 127–140 relied on.

REUBEN FRIEDMAN, Primary Examiner

FRANK A. SPEAR, Jr., Assistant Examiner

U.S. Cl. X.R.

210—22